United States Patent
Dougall et al.

(10) Patent No.: US 9,112,999 B2
(45) Date of Patent: Aug. 18, 2015

(54) AUTOMATED SELECTION OF TTY-MODES IN A MOBILE DEVICE

(75) Inventors: David J. Dougall, Waterloo (CA);
Gregory J. Fields, Waterloo (CA);
Gerhard D. Klassen, Waterloo (CA);
Mohamed Farid, North York (CA)

(73) Assignee: BlackBerry Limited, Waterloo, Ontario (CA)

( * ) Notice: Subject to any disclaimer, the term of this patent is extended or adjusted under 35 U.S.C. 154(b) by 1346 days.

(21) Appl. No.: 12/428,141

(22) Filed: Apr. 22, 2009

(65) Prior Publication Data
US 2010/0272243 A1    Oct. 28, 2010

(51) Int. Cl.
| H04M 11/00 | (2006.01) |
| H04M 11/06 | (2006.01) |
| H04M 1/2745 | (2006.01) |
| H04M 1/57 | (2006.01) |
| H04M 1/725 | (2006.01) |

(52) U.S. Cl.
CPC .......... *H04M 11/066* (2013.01); *H04M 1/2745* (2013.01); *H04M 1/57* (2013.01); *H04M 1/72591* (2013.01); *H04M 1/274508* (2013.01)

(58) Field of Classification Search
CPC .............. H04M 1/72591; H04M 1/72552; H04M 1/2474; H04M 1/6075; H04M 1/72588; H04M 3/42391; H04M 1/7259; H04M 1/2475
USPC ............... 379/52, 93.17, 142.04; 381/123; 455/418, 414.1
See application file for complete search history.

(56) References Cited

U.S. PATENT DOCUMENTS

| 5,604,786 | A * | 2/1997 | Engelke et al. ............... 379/52 |
| 6,188,429 | B1 * | 2/2001 | Martin et al. ............. 348/14.08 |
| 6,389,277 | B1 * | 5/2002 | Salzwedel .................. 455/414.1 |
| 6,545,616 | B1 * | 4/2003 | Haimi-Cohen ................ 341/91 |
| 7,142,841 | B1 * | 11/2006 | Almassy .................... 455/412.1 |
| 7,715,881 | B1 * | 5/2010 | Liu et al. ....................... 455/564 |
| 8,301,193 | B1 * | 10/2012 | Lynch et al. ............... 455/556.1 |
| 2004/0137944 | A1 | 7/2004 | Lee et al. |
| 2005/0048992 | A1 * | 3/2005 | Wu et al. ....................... 455/466 |
| 2005/0170820 | A1 * | 8/2005 | Shiomi et al. ................ 455/418 |
| 2006/0062371 | A1 * | 3/2006 | Vanderheiden et al. . 379/211.02 |
| 2006/0133583 | A1 | 6/2006 | Brooksby |
| 2006/0256950 | A1 | 11/2006 | Patel et al. |
| 2007/0072642 | A1 * | 3/2007 | Kangas et al. ............. 455/552.1 |

(Continued)

FOREIGN PATENT DOCUMENTS

WO    WO-2007/051132 A2    5/2007

OTHER PUBLICATIONS

Delucchi, Cecilia, European Search Report Regarding European Application EP09158545, Search Completed on Sep. 14, 2009, Munich.

*Primary Examiner* — Akelaw Teshale
(74) *Attorney, Agent, or Firm* — Jon Gibbons; Fleit Gibbons Gutman Bongini & Bianco P.L.

(57) ABSTRACT

Disclosed is a method and apparatus for allowing a user to select, from a plurality of TTY-modes, one TTY-mode to associate with one phone number. The associated TTY-mode will be used for either incoming or outgoing calls using that phone number. Further disclosed are a plurality of TTY-modes to associate with individual phone numbers, and, a selectable set of default TTY-modes to use if no TTY-mode is associated with a particular phone number. Selectable audio modes, associable with phone numbers or with TTY-modes, is also discussed.

20 Claims, 6 Drawing Sheets

(56) References Cited

U.S. PATENT DOCUMENTS

| | | |
|---|---|---|
| 2007/0127639 A1* | 6/2007 | Huang .................. 379/88.13 |
| 2007/0147350 A1* | 6/2007 | Bangor et al. .............. 370/352 |
| 2007/0167200 A1* | 7/2007 | Wong et al. .............. 455/575.9 |
| 2007/0202916 A1 | 8/2007 | Choi |
| 2008/0055236 A1* | 3/2008 | Christensen et al. ......... 345/156 |
| 2008/0260113 A1* | 10/2008 | Jean et al. .................. 379/88.13 |
| 2008/0309617 A1* | 12/2008 | Kong et al. .................... 345/157 |
| 2009/0221274 A1* | 9/2009 | Venkatakrishnan et al. .. 455/417 |
| 2009/0221321 A1 | 9/2009 | Fields et al. |

\* cited by examiner

Note: TTY-mode selection and use optionally includes audio mode selection and use.

AUTOMATED SELECTION OF TTY-MODES IN A MOBILE DEVICE

BACKGROUND

1. Field of the Invention

This disclosure relates generally to the field of mobile telephony, and in particular to setting TTY-modes in a mobile device using user-settable entries in an address book or other applications residing on the mobile device.

2. Description of the Related Art

Teletypewriters (TTYs), also known as telecommunication devices for the deaf (TDDs), enable the deaf or hearing impaired to communicate through the telephone system. A typical TTY device connects to a telephone through a jack, or, an existing telephone line. Historically a tone sequences transmitted by a TTY device representing a text message from a sender are received by a counterpart TTY device at the receiving end. During transmission, the tone sequences are converted to signals represented by zeroes and ones by a transmission protocol such as the 5-bit Baudot Code which maps 5-bit tone sequences to letters, numbers, and punctuation to allow transmission of text messages between the corresponding parties. These communications are not understood (coded or decoded) by non-TTY devices.

TTY text message is displayed on a TTY device in a single line whereby TTY "etiquette" between the two people using TTY devices is required to ascertain which correspondent should be typing next, and which text on the display belongs to who.

Mobile devices, or user equipment (UEs), that allow a TTY device to be connected through a jack require that a user pre-set the UE to be in TTY-mode before making a TTY call. This is typically done through a series of menu selections at a user interface (UI). Once the TTY call is finished, the user must go through one or a series of menus at the UI to de-select TTY-mode.

DETAILED DESCRIPTION

An apparatus and method for automatically putting a UE into one of a plurality of TTY-modes, as settable through the user interface (UI), is described. In the following description, for the purposes of explanation, numerous specific details are set forth in order to provide a thorough understanding of the disclosed material. It will be apparent, however, to one skilled in the art and having the benefit of the present disclosure that the ideas and embodiments described may be practised without adherence to just these specific descriptions.

The disclosure further encompasses computer-readable medium configured such that when executed by a processor (a.k.a. a micro-processor, or any other logic that can execute stored instructions), the processes described herein are carried out.

Figure 1:
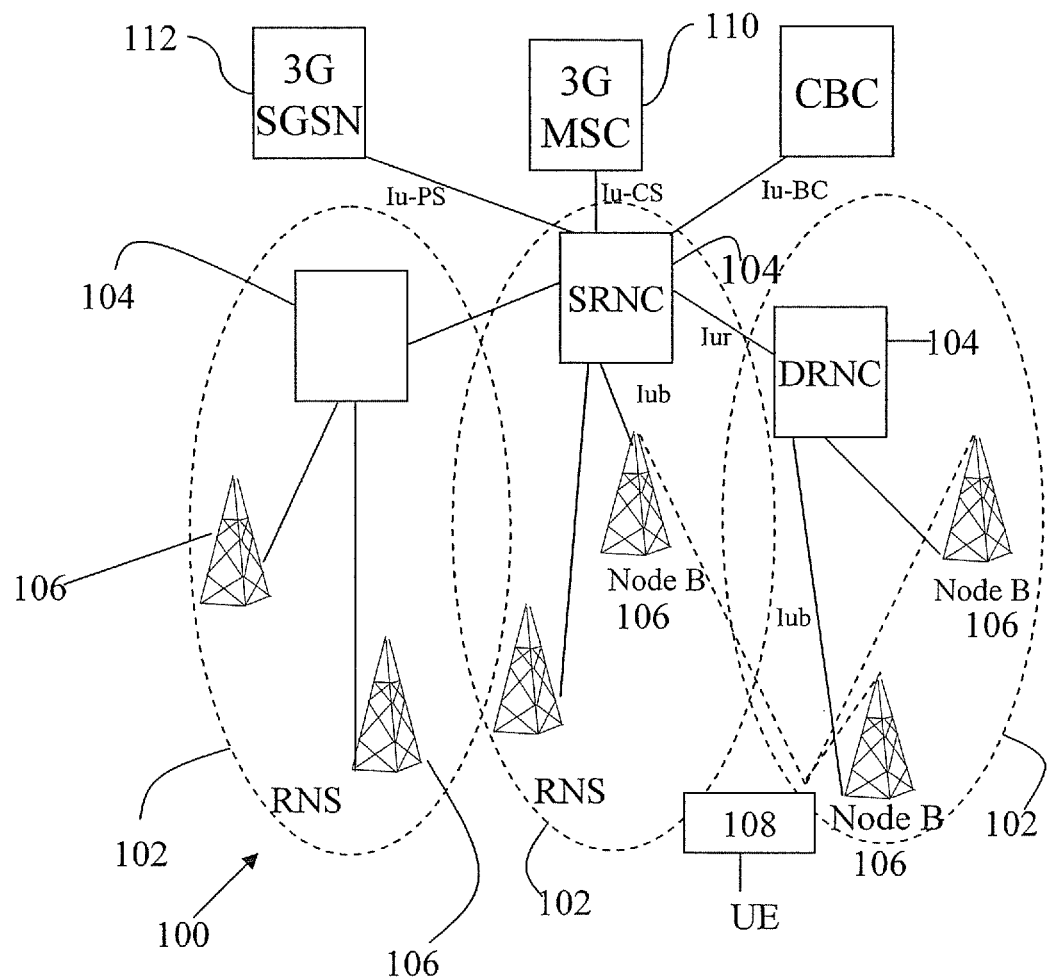
FIG. 1 is a block diagram of a communication system.

Referring to the drawings, FIG. 1 shows an overview of one embodiment of a telecommunications network and a UE device. Clearly in practice there may be many UE devices operating with the network, and, although one communications network is described this disclosure anticipates use in any suitable telecommunications system. For the sake of simplicity FIG. 1 only shows the major function blocks or components of a network. It will be clear to a person skilled in the art that in practice a network will include far more components than those shown.

FIG. 1 shows an overview of the universal terrestrial radio access network (UTRAN) 100 used in a universal mobile telecommunications system (UMTS). Network 100 comprises three Radio Network Subsystems (RNSs) 102. Each RNS has a Radio Network Controller (RNC) 104. Each RNS 102 has one or more Node Bs 106 which are similar in function to a Base Transmitter Station of a Global System for Mobile communications (GSM) radio access network. User Equipment (UE) 108 is one mobile within the radio access network. Radio connections (indicated by the straight dotted lines in FIG. 1) are established between the UE and one or more of the Node Bs in the UTRAN.

The radio network controller controls the use and reliability of the radio resources within the RNS 102. Each RNC may also connected to a 3G mobile switching centre 110 (3G MSC) and a 3G serving General Packet Radio Service (GPRS) support node 112 (3G SGSN). Each RNC 104 controls one or more 106 Node B's. An RNC plus its Node B's together make up an RNS 102. A Node B controls one or more cells. Each cell is uniquely identified by a frequency and a primary scrambling code.

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes. Each UE is also uniquely identifiable numerically. One popular example is a Subscriber Identity Module (SIM) which has stored thereon a service-subscriber key called an International Mobile Subscriber Identity (IMSI); a unique number may be permanently associated with the UE; other identification storage means are used as well.

Figure 2:
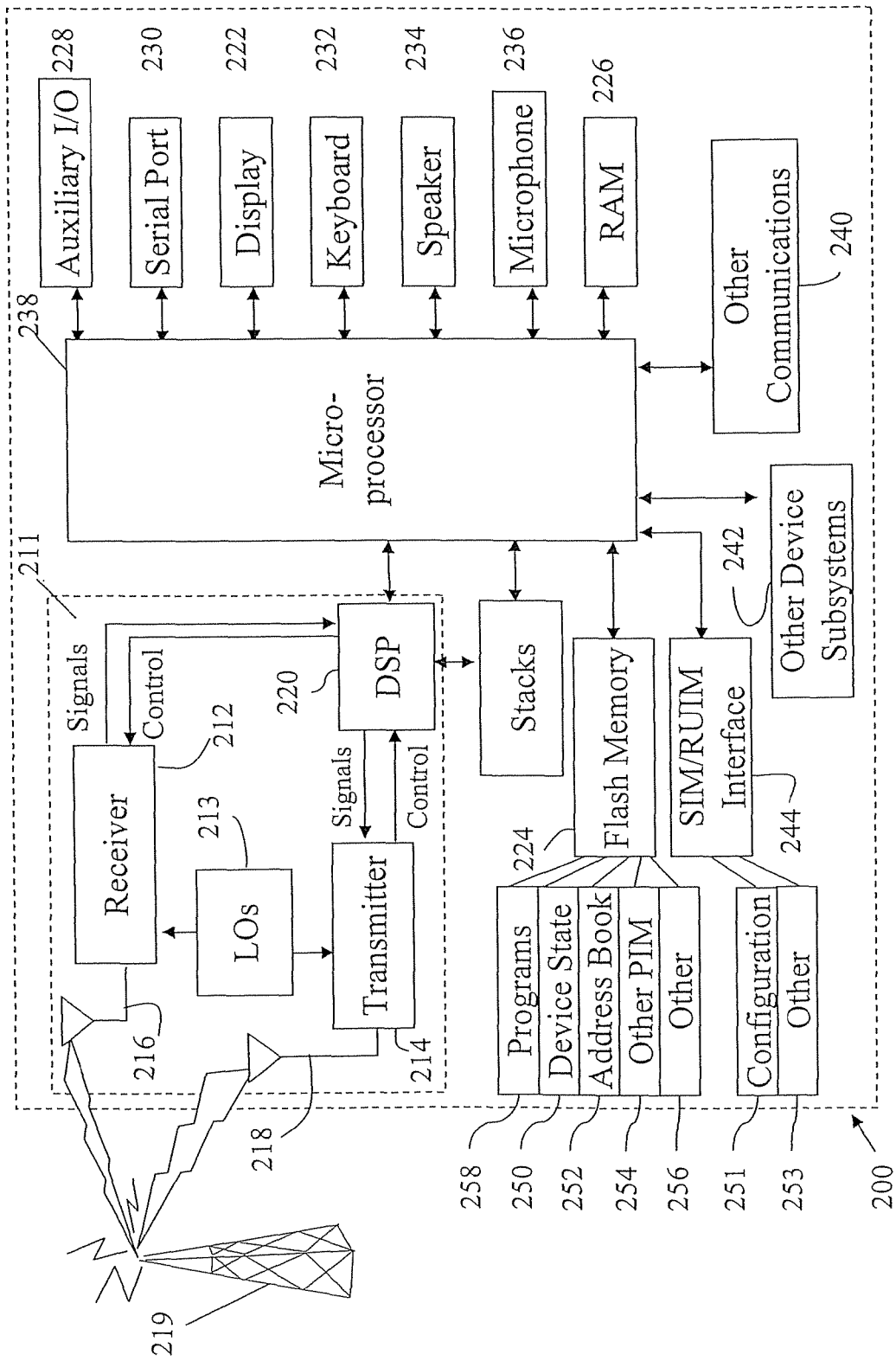
FIG. 2 is a block diagram of a wireless mobile communication device enabled for message transport selection.

Continuing on to FIG. 2, UE 200 (corresponding to UE 108 in FIG. 1) is an exemplary wireless communication device. UE 200 is a two-way wireless communication device having at least voice and preferably data communication capabilities. UE 200 may have the capability to communicate with other computer systems on the Internet. Depending on the exact functionality provided, the wireless device may be referred to as a data messaging device, a two-way pager, a wireless e-mail device, a cellular telephone, a cellular telephone with data messaging capabilities, a wireless Internet appliance, or a data communication device, as examples.

UE 200 incorporates a communication subsystem 211, including both a receiver 212 and a transmitter 214, as well as associated components such as one or more antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the device is intended to operate and the current state-of-the-art. For example, mobile station 200 may include a communication subsystem 211 designed to operate within the Mobitex™ mobile communication system, the DataTAC™ mobile communication system, GPRS network, UMTS network, EDGE network, or any other suitable telecommunications network.

Network access requirements will also vary depending upon the type of network. For example, in the Mobitex and DataTAC networks, mobile station 200 is registered on the network using a unique identification number associated with each mobile station. In UMTS and GPRS networks, however, network access is associated with a subscriber or user of mobile station 200. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 200 will be unable to carry out any other functions involving communications over the network. The SIM interface 244 is normally similar to a card-slot into which a SIM card can be inserted and ejected like a diskette or PCMCIA card. The SIM card can typically have approximately 64K of memory and will have more as memory costs decrease, and, typically holds key configuration information 251 and other information 253 such as identification and subscriber related information.

When required network registration or activation procedures have been completed, mobile station 200 may send and receive communication signals over the network (generally represented by 219). Signals received by antenna 216 through the communication network are input to receiver 212, which may perform such common receiver functions as signal amplification, frequency down conversion, filtering, channel selection and the like, and in the example system shown, analogue to digital (A/D) conversion. A/D conversion of a received signal allows more complex communication functions such as demodulation and decoding to be performed in the DSP 220. In a similar manner, signals to be transmitted are processed, including modulation and encoding for example, by DSP 220 and input to transmitter 214 for digital to analogue conversion, frequency up conversion, filtering, amplification and transmission over the communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station or UE 200 typically includes a microprocessor 238 which controls the overall operation of the device by executing code, or software, stored in an executable sequence in memory retrievable by the microprocessor. Communication functions, including at least data and voice communications, are performed through communication subsystem 211. Microprocessor 238 also interacts with further device subsystems such as the display 222, flash memory 224, random access memory (RAM) 226 and/or any other memory type (not shown), auxiliary input/output (I/O) subsystems 228, serial port 230, keyboard 232, speaker 234, microphone 236, a short-range communications subsystem 240 and any other device subsystems generally designated as 242. Specifically included is the user interface (UI), which typically includes the aforementioned keyboard but is not limited to a keyboard. The keyboard may be physical or virtual, or, the UI can be configured as a series of choices where input at the keyboard determines which of the choices will be executed (implemented) by the UE when the UE runs an application which makes use of selections determined at the UI. An application is any combination of software, or code executable by the microprocessor, stored in memory accessible by the microprocessor that when executed enables the functionality described.

Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Operating system software used by the microprocessor 238 is preferably stored in a persistent store such as flash memory 224, which may instead be a read-only memory (ROM) or similar storage element that can keep state through power cycling (not shown). Those skilled in the art will appreciate that the operating system, as well as logically defined applications such as games, address books, or parts thereof, are code or software which may be temporarily loaded into a volatile memory such as RAM 226 from NVRAM or ROM or any other involatile memory. Received communication signals may also be stored in RAM 226.

As shown, flash memory 224 can be segregated into different areas for both computer programs 258 and program data storage 250, 252, 254 and 256. These different storage types indicate that each program can allocate a portion of flash memory 224 for their own data storage requirements. Microprocessor 238, in addition to its operating system functions, enables execution of software applications on the mobile station. A predetermined set of applications that control basic operations, including at least data and voice communication applications for example, will normally be installed on mobile station 200 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application may have the ability to send and receive data items, via the wireless network and may further be configured to exchange data or information with other applications such as address book 252 if desirable. In one embodiment, the PIM data items are seamlessly integrated, synchronized and updated, via the wireless network, with the mobile station user's corresponding data items stored or associated with a host computer system. Further applications may also be loaded onto the mobile station 200 through the network, an auxiliary I/O subsystem 228, serial port 230, short-range communications subsystem 240 or any other suitable subsystem 242, and installed under the direction of a user in the RAM 226 and/or also in a non-volatile store (not shown) for execution by the microprocessor 238. Such flexibility in application installation increases the functionality of the device and may provide enhanced on-device functions, communication-related functions, or both. For example, secure communication applications may enable electronic commerce functions and other such financial transactions to be performed using the mobile station 200. Applications as used herein further includes the software (code) needed to implement the TTY-related functionality described herein.

In a data communication mode, a received signal such as a text-based message, TTY compatible data, or web page download will be processed by the communication subsystem 211 and input to the microprocessor 238, which preferably further processes the received signal for output to the display 222, or alternatively to an auxiliary I/O device 228. If the UE is in external TTY device mode (external-TTY-mode), the output is sent to a TTY device (not shown) through one of the I/O port 228 or serial port 230 depending on how the UE and the external TTY device are designed. If the UE is in external-TTY-mode, user input is received through the same port, i.e., there will be a TTY device connected to a single port, and data will be both sent from the UE to the TTY device and received from the TTY device through that port. A user of mobile station 200 may also compose data items such as email messages for example, using the keyboard 232, which may be a complete alphanumeric keyboard or telephone-type keypad, in conjunction with the display 222. If the device is in external-TTY-mode, this will occur through the port to which the TTY device is operably connected. Such composed items may then be transmitted over a communication network through the communication subsystem 211.

UE 200 is enabled, using code executable by the microprocessor, to detect a trigger event and set itself into and out of external-TTY-mode. This code may be a standalone set of instructions callable by other code or software, or may be configured as part of a larger component or software package as needed.

For embodiments where the UE has the needed hardware (e.g., alphanumeric input, text output on a display, etc.), which is typically found on a smart device, TTY functionality may also be processed internally on the UE. This occurs when the UE is in internal-TTY-mode. To do so there will be a computer readable medium, software package, code, application, or any combination thereof that when executed by the microprocessor causes the UE to act as a TTY device (be able to encode and decode TTY-compatible signals as needed). In this mode, no external device is needed, and, user I/O is through the UEs keyboard and display. The UE is not in any way limited to act like a traditional TTY; rather, the UE has the TTY's basic functionality and much more, as will be further described below.

For voice communications, overall operation of mobile station 200 is similar, except that received signals would preferably be output to a speaker 234 and signals for transmission would be generated by a microphone 236. Alternative voice or audio I/O subsystems, such as a voice message recording subsystem, may also be implemented on mobile station 200. Although voice or audio signal output is preferably accomplished primarily through the speaker 234, display 222 may also be used to provide an indication of the identity of a calling party, the duration of a voice call, or other voice call related information for example.

Serial port 230 may be used in a personal digital assistant (PDA)-type device or a "smart-phone" for use in synchronizing data on the UE with a user's desktop computer (not shown), if the UE supports this type of functionality. Such a port 230 would enable a user to set preferences through an external device or software application and would extend the capabilities of mobile station 200 by providing for information or software downloads to mobile station 200 other than through a wireless communication network. The alternate download path may for example be used to load an encryption key onto the device through a direct and thus reliable and trusted connection to thereby enable secure device communication, or, to make it easier to set the fields needed to enable the UE to automatically set its state.

Other communications subsystems 240, such as a short-range communications subsystem, is a further optional component which may provide for communication between mobile station 200 and different systems or devices, which need not necessarily be similar devices. For example, the subsystem 240 may include an infrared device and associated circuits and components or a Bluetooth™ or USB communication module to provide for communication with similarly enabled systems and devices, including any so-equipped TTY devices.

The memory 224 is a writeable store such as a RAM into which other device components and systems may write data, and includes a storage area for an address book 252, and an application data storage area 256. The address book 252 stores contact information. In one embodiment, address book 252 includes fields for use in storing user-settable TTY-mode selections, and, used to set the UE's TTY-mode automatically upon reading the fields at call initiation or call receipt. In other embodiments, there may be a stand-alone application that resides in memory and performs the same function (it is not necessary to have an address book). Entries in such an address book may be used, in some embodiments, for addressing outgoing messages, or to replace addressing information, such as an email address, in an outgoing or received message with a personal or familiar name from a corresponding address book entry. In other embodiments an address book is used to associate information about a caller based on the incoming phone number, or, to make it easy to make outgoing calls by simply referencing an entry in the book at the UI. An address book entry can be created either manually, for example by inputting contact information or selecting an address from a received message using an input device (not shown), or automatically, such as using downloaded information from either a local source such as another UE or a PC over a local connection, or over the air from a network. The application data store 256 stores data associated with software modules and applications on the UE (mobile device) 200. Data stored in the application data store 256 typically includes not only files and data that are processed by software applications, but also configuration information.

The data store 256 is illustrative of stores that may be implemented in the memory 224 on the UE 200. The memory 226 may also be used by other device systems in addition to those shown in FIG. 2, and used to store described herein as well as other types of data. Users of mobile devices or UEs may be physically impaired in several ways. A user may be deaf or hard-of-hearing (HoH). A user may be unable to speak (lost the use of their vocal chords or other impairment), or unable to speak in a manner suitable for voice-only communications. Each user may have some or all of these difficulties to overcome. Each user has the freedom to decide which applies to them for the purposes of communicating using a UE. For the purposes of this disclosure, users may be functionally categorized as one of: deaf/HoH or hearing, and, one of: speaking or non-speaking. This leads to each user (either the caller or the called) having one of four possible characteristic or type, described below. For this disclosure, the call initiating party, or the calling party, is the "caller" and the receiving party, or the called party, is the "called".

Four Caller Characteristics Or Types:
(1) Deaf or hard-of-hearing (HoH) & No speech
Traditional TTY user.
Requires TTY-based communication to be sent to called.
Requires TTY-based communication to be received from called.
(2) Hearing & No speech
HCO (Hearing Carry Over) user.
Requires TTY-based communication to be sent to called.
Can receive TTY-based communication and/or voice from called.
(3) Deaf or HoH & Speech
VCO (Voice Carry Over) user.
Can send TTY-based communication and/or voice to called.
Requires TTY-based communication to be received from called.
(4) Hearing & Speech
Traditional voice user, does not require TTY services but may use them.
Four Called Characteristics Or Types:
(5) Deaf or HoH & No speech
Traditional TTY user.
Requires TTY-based communication to be received from caller.
Requires TTY-based communication to be sent to caller.
(6) Hearing & No speech
HCO (Hearing Carry Over) user.
Can receive TTY-based communication and/or voice from caller.
Requires TTY-based communication to be sent to caller.
(7) Deaf or HoH & Speech
VCO (Voice Carry Over) user.
Requires TTY-based communication to be received from caller.
Can send TTY-based communication and/or voice to caller.
(8) Hearing & Speech
Traditional voice user, does not require TTY services but may use them.

The characteristics of the caller and called can be mapped into one of four call characteristics, call types, or TTY-modes (TTY-mode and TTY mode are used interchangeably herein). The four types or modes are:
2-way TTY required;
1-way TTY required Caller→Called;
1-way TTY required Called→Caller; and,
no TTY required.

These are described more fully in the table below. The Caller Type and Called Type use the numerical indicators from the description above.

| Caller Type | Called Type | Connection Type |
|---|---|---|
| 1 | All | 2-way TTY required, no voice |
| 2 | 5 | 2-way TTY required, no voice |
| 2 | 6 | 2-way TTY required, no voice |
| 2 | 7 | Caller -> Called, TTY required<br>Called -> Caller, voice OK, TTY optional<br>1-way TTY required (Caller -> Called),<br>may use 2-way TTY, with voice |
| 2 | 8 | Caller -> Called, TTY required<br>Called -> Caller, voice OK, TTY optional<br>1-way TTY required (Caller -> Called),<br>may use 2-way TTY, with voice |
| 3 | 5 | 2-way TTY required, no voice |
| 3 | 6 | Caller -> Called, voice OK, TTY optional<br>Called -> Caller, TTY required, no voice<br>1-way TTY required (Called -> Caller),<br>may use 2-way TTY, with voice |
| 3 | 7 | 2-way TTY required, no voice |
| 3 | 8 | Caller -> Called, voice OK, TTY optional<br>Called -> Caller, TTY required<br>1-way TTY required (Caller -> Called),<br>may use 2-way TTY, with voice |
| 4 | 5 | 2-way TTY required, no voice |
| 4 | 6 | Caller -> Called, voice OK, TTY optional<br>Called -> Caller, TTY required<br>1-way TTY required (Called -> Caller),<br>may use 2-way TTY, with voice |
| 4 | 7 | Caller -> Called, TTY required<br>Called -> Caller, voice OK, TTY optional<br>1-way TTY required (Called -> Caller),<br>may use 2-way TTY, with voice |
| 4 | 8 | Voice-only call, no TTY |

The above table shows various options and settings that could be made available to a user of a UE, associable with a phone number (or person or other ID have a phone number associated with the ID).

If the UE is connected to an attached TTY device, the choice will typically be limited to set the TTY-mode to either "on" or "off" for each number. In this case, the UE may be configured to act as a pass-through device for the separate TTY device that is attached. It is possible to have the UE decode the TTY signals internally and pass the signals to the TTY device, so the UE could be used as a display for the TTY communications in addition to the attached TTY device. This is not expected to be a popular embodiment due to the redundant equipment, but is fully contemplated. The UE may also be configurable, at the UI, such that when the phone detects that a TTY device has been attached the phone sets all calls to TTY-mode until the device is detached.

When used with a native or internal TTY software package on a smart phone such as the BlackBerry™, whereby the UE has the software and hardware needed to act like a TTY device (it is a TTY-compatible device), a TTY setting (or call type, call mode, or TTY mode) can be associated with a specific ID or phone number to any of the types described herein. Example TTY-mode settings are given below (this is a possible selection of modes based on the tables above).

(A) TTY on, audio off: TTY functionality both ways, with no audio being sent to the called or presented to the caller (2-way TTY communications with no audio).
(B) TTY on, audio on: TTY functionality both ways, with audio also being sent and presented to the caller and called (2-way TTY communications with 2-way audio).
(C) TTY out, audio in: sends only TTY data to called; presents only audio to the caller (1-way TTY communications from caller to called, 1-way audio communications from the called to the caller).
(D) TTY in, audio out: sends only audio signals to called; presents only TTY data to the caller (1-way TTY communications from called to caller, 1-way audio communications from the caller to the called).
(E) TTY off: audio-only call (2-way audio with no TTY communications).

Other possible modes include 2-way audio used with 1-way TTY communications, or, 2-way TTY communications used with 1-way audio.

This plurality of modes enables users to set their TTY settings taking into account both their needs and desires, and, the needs and desires of the receiving party. Examples are given below.

A type 2 caller user can set their phone to:
associate mode (A) with the phone number of a type 5 contact, resulting in no audio signal either way which minimizes contributions to background noise to others if the type 5 user tends to have hearing people close by; and,
associate mode (C) with the phone number of a type 8 contact who either does not like to use, or, has physical limitations which prevent their using a TTY device for input, but who can receive the TTY data on their equipment (this also better enables the user's phone display to be usable for purposes in addition to its TTY functions, as TTY data is not being displayed from two sources thereon);

A type 3 user who is hard of hearing but not deaf to set their phone to:
associate mode (A) with the phone number of a type 5 contact, resulting in no audio signal either way (helps keep background noise down for others nearby);
associate mode (B) with the phone number of a type 7 contact who is also hard of hearing but not deaf, which allows the use of the TTY output to supplement and/or correct the audio conversation; and,
associate mode (E) with the phone number of a type 8 contact, who has no TTY capability.

A type 4 user can set their phone to:
associate mode (A) with the phone number of a type 5 contact, resulting in no audio signal either way (helps keep background noise down for others nearby);
associate mode (B) with the phone number of a type 7 contact who is also hard of hearing but not deaf, which allows the use of the TTY output to supplement and/or correct the audio conversation on as as-needed basis; and,
associate mode (E) with the phone number of a type 8 contact.

These are just a few examples; all combinations of settings may be fully supported in any one embodiment. There may also be embodiments where a subset of all possible selections are implemented in a specific UE. For example, a simplified UI on a lower-cost phone may be configured to allow only an on/ff TTY selection for each ID or phone number (no 1-way TTY connections, or no combination of TTY and audio).

In addition to setting and using TTY-modes, in one embodiment a smart phone such as a BlackBerry with a native TTY application can be configured to automatically enable the use of a headset, such as a Bluetooth™ or hardwired headset, for audio I/O to better enable the UE's screen to be usable for the textual portion of TTY communications (held in front of the eyes rather than near the ear). Different audio mode settings can be associated with different TTY-modes, and, there can also be a default audio mode for each TTY-mode. Some embodiments will associate an audio mode with a TTY-mode; other embodiments may have a hierarchical audio mode selection where, if there is no audio mode associated with a specific phone number (highest priority), and, of there is no audio mode associated with the phone number's TTY-mode (next level of priority), a general default audio made is used.

Audio modes may be very simple, such as "use speaker-phone settings when any TTY-mode is selected other than no-TTY". They may be more complex, offering choices between speaker-phone, wireless audio input/output (typically a BlueTooth® headset), hardwire audio input/output, or, "normal" UE audio I/O. Any method of audio I/O is usable with the present disclosure, and can be added as an option to selectable audio I/O already existing on a UE.

Figure 3:
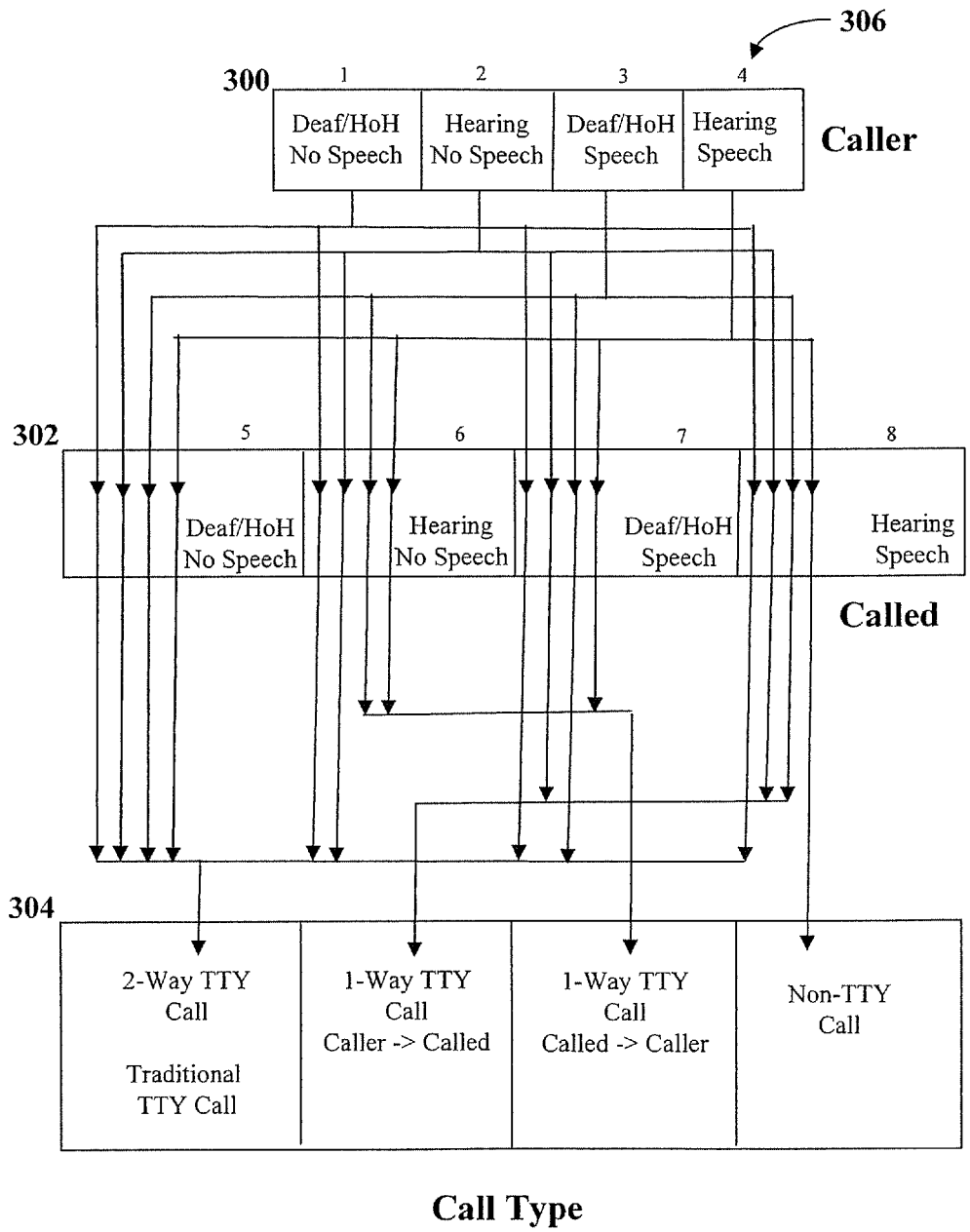
FIG. 3 is a chart mapping caller type and called type into a call type (TTY-mode).

FIG. 3 illustrates the mapping of the caller type, the called type, and the resulting call type (TTY-mode). Block 300 is the starting point. Each of the 4 types of caller is given. The small numeric 306 corresponds to the caller/called descriptions discussed above. Starting with one of the caller types, follow the lines to the called type desired. For example, select caller type 2 (hearing, no speech) and follow the lines coming from caller type 2's box to one of the called types in large box 302 such as type 7 (Deaf/HoH, speech). Continue following the arrows out of box 7 to one of the call types found in large box 304. In this case, starting from caller type 2 to called type 7 leads to call type 1-way TTY, Caller to Called (pictured as caller→called). This can be done for any combination of caller and called to determine the minimal TTY-mode required.

As noted at the bottom of FIG. 3, one embodiment will allow any of the call types to be optionally mapped (at the UI by the user) to a full 2-way TTY connection if desired, with or without audio. Other embodiments may be enabled to allow mapping of one or both of the 1-way TTY connections to a 2-way TTY connection, or, to require that one or both of the 1-way TTY connections map to a 2-way TTY connection.

Figure 4A:
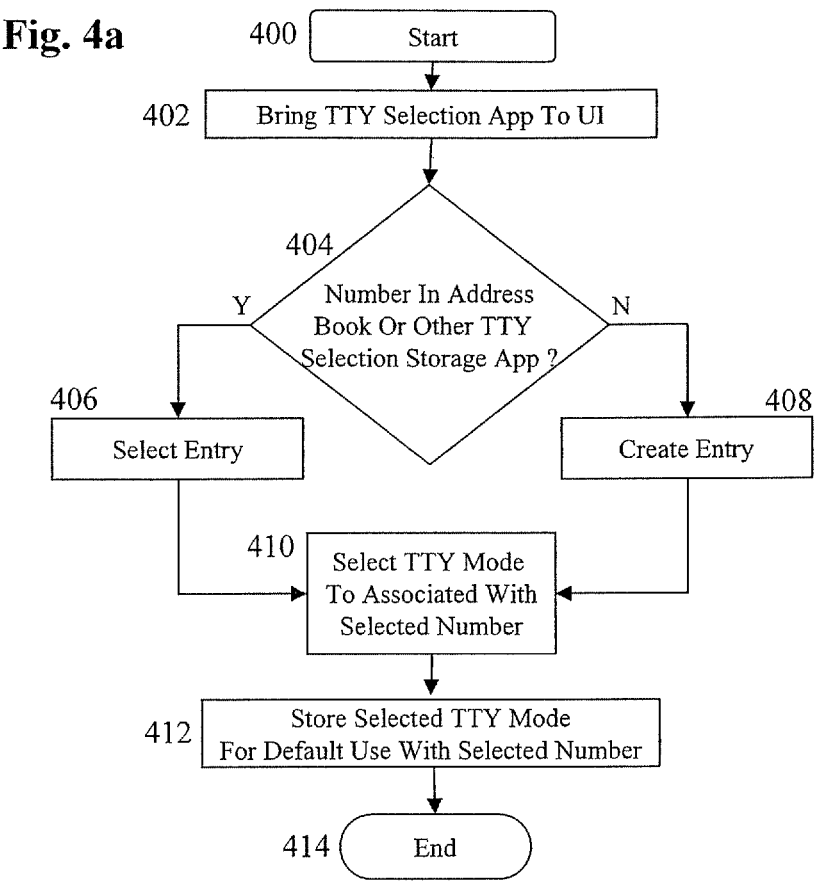
FIG. 4 is a flow chart illustrating the generation of an association between a phone number and a TTY-mode (call type).

Continuing to FIG. 4 and discussing FIG. 4a, shown is a flow diagram for associating a TTY-mode with a phone number or ID. Starting the process at block 400, the user selects or indicates, at the UI, that an association between a phone number or ID is to be made. This may take any form a UI designer may desire. For example, there may be an icon permanently on the touch screen of the UE that when touched, initiates these actions. There may be a single purpose or multi-function button to push, or, there may be a series of one of more menu screens to traverse to select the initiation of the process. Any method may be used to allow the selection or initiation, at the UT, of the UI options or sequence needed to allow an association between a phone number and a TTY-mode to be made.

Continuing to block 402, the UE presents in a manner enabling the user to interact with the UT, the application that will associate a TTY-mode with a phone number or ID. Typically this may be a presented as an icon, menu, tab, or visual indicia on a screen but is not limited to that UT interface; any presentation intended to be detectable by a user may be used. Going forward, when a TTY-mode is said to associated with a phone number, it is to be understood that the association is made in accordance with the application or package being used by the UE. For cost-reduced models, there may be a simple UT comprising a few steps or input screens that literally associates a phone number (numeric string) with a TTY-mode (could be a single bit field if the selection were reduced to TTY-mode on or off, or a 2-bit field for 4 TTY-modes). At the other extreme, the UE may have a full functionality address book or personal information manager (PIM) that uses an identifier (ID) other than a phone number to correlate all information related to the ID. This correlated information could include one or more phone numbers, and, a TTY-mode for each phone number. Thus, it will be understood that the specifics of the UI will of necessity be determined by, and consistent with, the application that is used to generate and store the association between phone numbers and TTY-modes. Consistent with the application in which the association will be used and stored in the UE, the UI used to associate a phone number and TTY-mode is initiated.

Moving into decision diamond 404, the UE needs to determine if the phone number to be associated with a TTY-mode already exists as an entry in the association application ("association application" means any application or code that makes the association between the phone number and the TTY-mode, from the simplest dedicated package to a full blown PIM application). There will be a UI selection allowing an indication that the phone number to be associated with a TTY-mode is new or known. If the phone number is new, the "N" exit is taken from decision diamond 404 to box 408. The actions associated with box 408 are those needed to create a new phone number entry in the application that keeps the association. Once completed, box 408 is left for box 410.

If the answer in decision diamond 404 is yes, the "Y" exit is taken to box 406. The actions associated with box 406 are those needed to allow selection of a phone number already in the association application. The UI will enable the user to indicate which phone number is to be associated with a TTY-mode (or to be associated with a different TTY-mode). After an existing phone number is selected, box 406 is left for box 410.

Actions associated with box 410 include the selection (from a menu) or otherwise detecting which TTY-mode to associate with the currently selected phone number. Any of the TTY-modes described herein may be a choice, or, there may be a subset of all possible described herein allowed. Once a TTY-mode is selected, input, or otherwise indicated at the UI, box 410 is left for box 412.

Actions associated with box 412 include retrievably storing, in association with the phone number, a TTY-mode. Box 412 is left for end point 414, indicating that the newly generated associate is ready for use with incoming or outgoing calls.

Figure 4B:
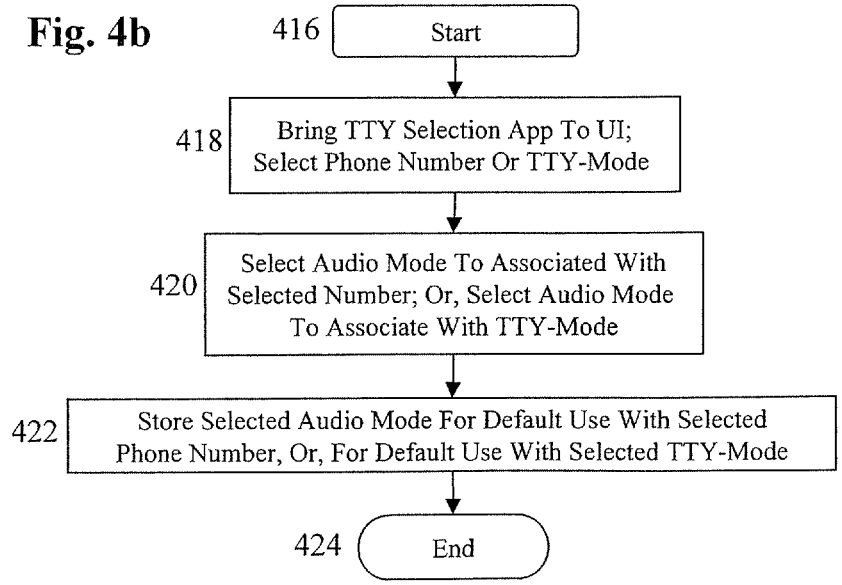

FIG. 4b is a flow chart illustrating the association of an audio mode with a phone number (or ID). Start indicator 416 is associated with the phone detecting an indication that an audio mode association with a phone number is to be made. Note that this may be the same entry point as 400. Box 418 is entered, where the phone number for which an audio mode is to be set is determined. A process of determining if a particular phone number already exists in the association application, or needs to be entered, was described above and applies equally here. Alternatively, a TTY-mode may be selected as the entity to which an audio mode is to be associated. Not illustrated, but fully contemplated, is a further option will sets the default audio mode for all TTY-modes on the UE. UE designers may mix and match these association capabilities depending on the complexity and cost-point of the UE.

Continuing with box 420, the UI is enabled to detect input from a user as to which of the available audio modes is to be associated with a phone number. Typically this will be presented as a list of available audio modes from which the user selects one, but any UI allowing a selection of an audio mode will work. Alternately, the selected audio mode is associated with a TTY-mode, which will then be used with any phone number having that TTY-mode associated with it. Alternatively, the audio mode is assigned as the general phone default, usable with any TTY-mode for which no other audio mode is associated.

Continuing with box 422, the selected audio mode is stored in a manner to be associated with the phone number, TTY-mode, or as the general default. End point 422 indicates that the selected and stored audio mode is now useable with its associated entity (phone number, TTY-mode, or general UE default) for incoming and outgoing calls.

Figure 5:
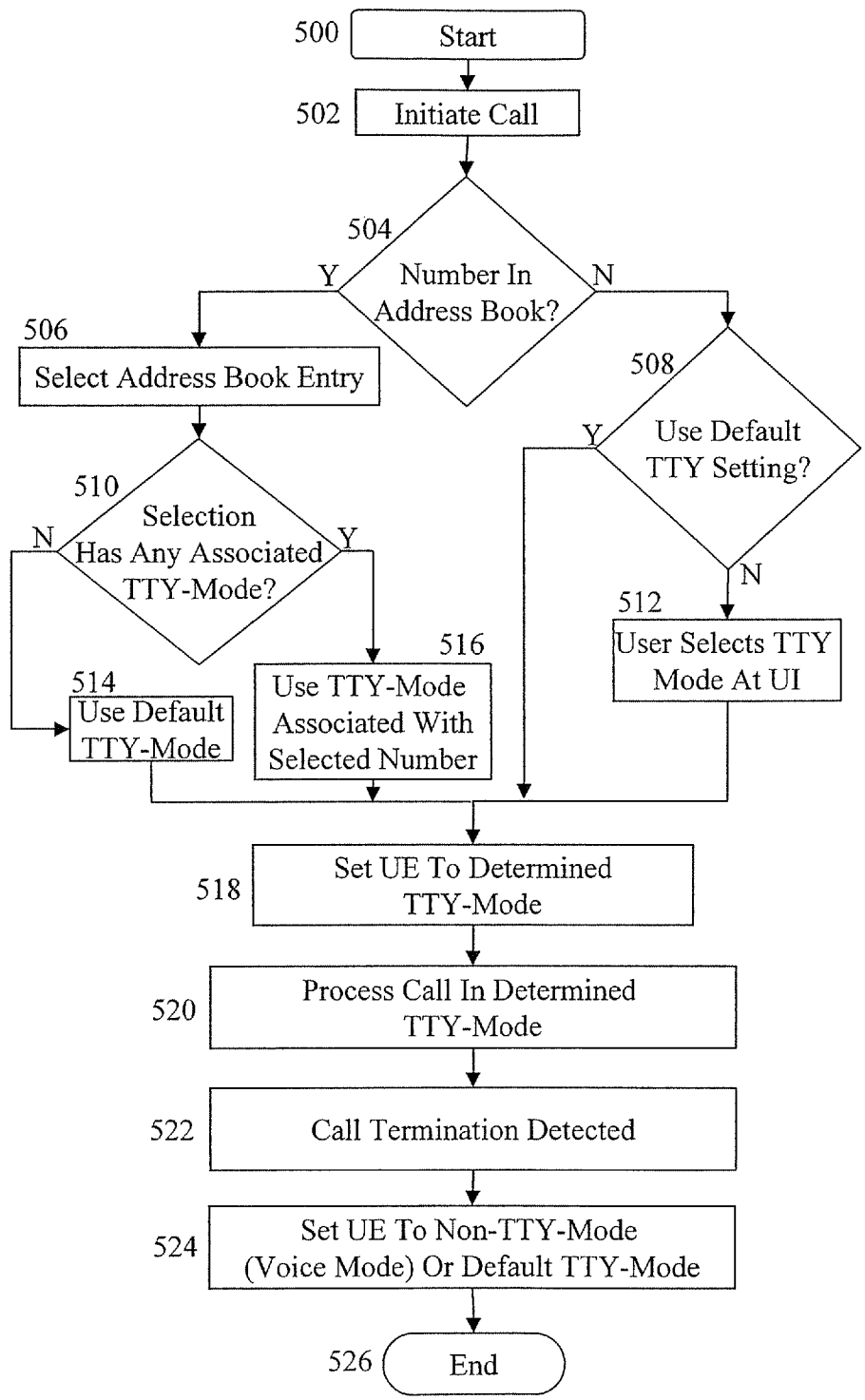
FIG. 5 is a flow chart illustrating the initiation of a call using user-settable TTY-mode settings.
Figure 6:
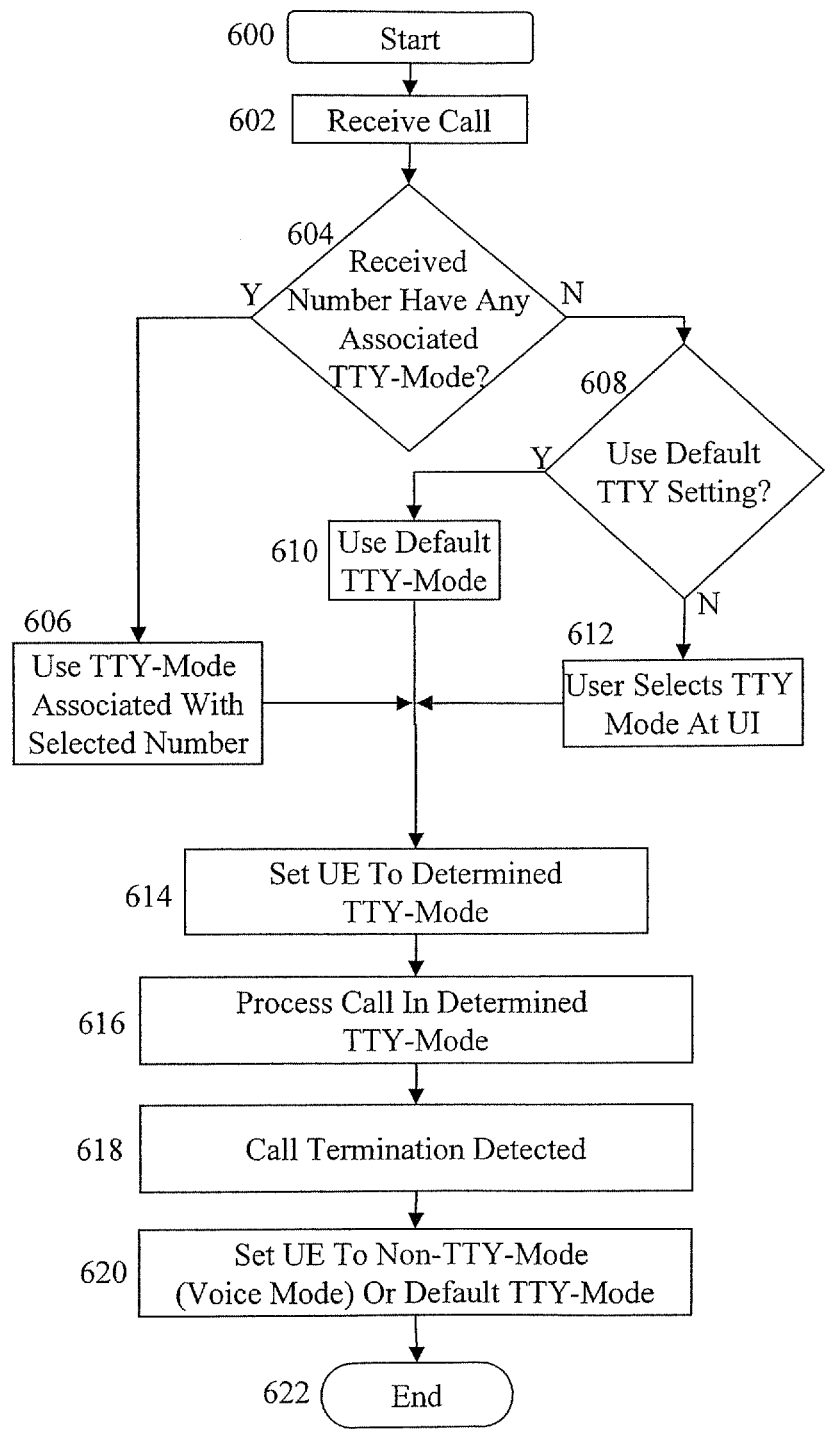
FIG. 6 is a flow chart illustrating the receipt of a call using user-settable TTY-mode settings.

Throughout the descriptions of FIGS. 5 and 6, a TTY-mode selection and use process is described. For each TTY-mode selection made, there is an associated audio mode selection made. The audio mode may be associated with the phone number, with a TTY-mode, or, as a general UE default. Note that there will typically be a general UE default audio mode set or implemented by the UE manufacturer or service provider, if the user has not made any audio mode selections. Showing the associated audio mode selection in addition to the TTY-mode selection in each part of the illustration would over-complicate the illustration. Thus, although not discussed in detail in FIGS. 5 and 6, the description fully encompasses the selection of an audio mode with the selection of a TTY-mode. This does not mean all embodiments of UEs will have audio mode selection. Some embodiments will only have the TTY-mode selection and will use pre-programmed audio mode settings, so the user may not be enabled to change them. Other embodiments will enable the setting and use of audio modes with the TTY-modes. FIGS. 5 and 6 are to be read as allowing, but not requiring, audio mode selection and use in parallel to TTY-mode selection and use.

Continuing to FIG. 5, illustrated is a use of the TTY-mode associated with a phone number for an outgoing call (a call made from the UE). The process start indicator 500 is associated with any actions needed to start a phone call. Once initiated, box 502 is entered. The actions associated with box 502 include the UE determining the phone number to be called, at which time box 502 is left for decision diamond 504. The actions associated with decision diamond 504 are determining if the phone number to be called is in the association application (indicated as an "address book" in FIG. 5, which is one embodiment). If the answer is yes, the "Y" exit is taken to box 506. If the answer is no, the "N" exit is taken to box 508.

The actions associated with box 506 are to retrieve the phone number entry and any associated data. Continuing into decision diamond 510, if the associated data includes a TTY-mode, then the "Y" exit is taken to box 516. If there is no TTY-mode indicator or data, then the "N" exit is taken to box 514. The actions associated with box 514 include using a default TTY-mode. Note that this may involve several sub processes, and will be very embodiment-dependent. Some embodiments will allow a user to set a default TTY-mode for calls in general. Alternatively, there may be a standard default in use as set by a service provider or other administrator. The default selection will be used whenever there is no other TTY-mode associated with this phone number. Alternatively (not shown), the UI may display an indicator that this number, although in the association application, has no TTY-mode selected. The UI will allow the user to use either the default TTY-mode, or, to enter a TTY-mode to be used with this phone number going forward, or, as a one-time event. A TTY-mode is determined thereby, and box 514 is left for box 518.

If the "Y" exit was taken from decision diamond 510 to box 516, then the actions associated with box 516 are carried. This includes the retrieval of the associated TTY-mode for this phone number. Box 516 is left for box box 518.

The actions associated with box 518 include setting the UE to use the just determined TTY-mode for this call. This may be any of the TTY-modes discussed herein. Continuing into box 520, the call is made and processed according to the TTY-mode. This continues for the life of this call. Once an end-of-call is detected, box 522 is entered. The action associated with box 522 are those associated with terminating a call (winding down any TTY output, or otherwise terminating the TTY-mode currently in use). After the call is terminated, box 524 is entered. The actions associated with box 524 include those associated with resetting the UE to a default TTY-mode (which includes a non-TTY-mode or voice-only mode). Note that this will be embodiment-dependent, as some phone designers may chose to leave the phone in the TTY-mode just used, under the assumption that the next call may well use the same TTY-mode. Box 524 is exited for end point 526, which corresponds to the phone being in a state ready to used for a next incoming or outgoing call.

Continuing to FIG. 6, shown is an example flow for receiving a call. Process start point 600 corresponds to the UE being ready to receive a call. Box 602 is entered upon receipt of an incoming call, where further actions comprise the UE determining what phone number is associated with the incoming call. Decision diamond 604 is then entered, to determine if there is a TTY-mode associated with this phone number. If the answer is no, there is no TTY-mode associated with this phone number, and the "N" exit is taken to decision diamond 608. If the answer is yes, there is a TTY-mode associated with this phone number, then the "Y" exit is taken to box 606. The actions corresponding to box 606 include retrieving the TTY-mode associated with the incoming phone number. Box 606 is left for box 614.

The decision made at decision diamond 608 is if a UE default TTY-mode is to be used. If the UE is set to use a default TTY setting for incoming calls, the "Y" exit is taken to box 610. The actions associated with box 610 are to select the default TTY-mode. If the default TTY-mode is not to be used, the "N" exit is taken to box 612. The actions associated with box 612 are to invoke the use of an UI interface to enable the user to indicate what TTY-mode to use. This may be a simple single menu selection between a small number of choices, or may be a series of options traversed through several menus. In all cases the user indicates which TTY-mode is to be used. In some embodiments, the phone may select a default TTY-mode if the user does not respond within a predetermined time limit. This is to prevent the phone from not responding to the incoming call if the user is in some way incapacitated. The algorithm ends with some TTY-mode being selected. Box 612 is left for box 614.

The actions associated with box 614 include setting the UE to use the just determined TTY-mode for this call. This may be any of the TTY-modes discussed herein. Continuing into box 616, the call is made and processed according to the TTY-mode. This continues for the life of this call. Once an end-of-call is detected, box 618 is entered. The action associated with box 618 are those associated with terminating a call (winding down any TTY output, or otherwise terminating the TTY-mode currently in use). After the call is terminated, box 620 is entered. The actions associated with box 620 include those associated with resetting the UE to a default TTY-mode (which includes a non-TTY-mode or voice-only mode). Note that this will be embodiment-dependent, as some phone designers may chose to leave the phone in the TTY-mode just used, under the assumption that the next call may well use the same TTY-mode. Box 620 is exited for end point 622, which corresponds to the phone being in a state ready to used for a next incoming or outgoing call.

The above descriptions are to illustrative examples of the new and unobvious ideas contained herein. To people having the benefit of this disclosure and who have knowledge in this field, variations will be apparent while staying within the scope of the concepts described and claimed, whether or not expressly described.

The invention claimed is:

1. A method of setting a teletypewriter-mode for use in an incoming call in a user equipment, the user equipment configurable for use in a wireless telecommunications system, the method comprising:
    detecting the incoming call;
    determining a phone number for the incoming call;
    determining if one of a plurality of teletypewriter modes is associated with the phone number;
    enabling selection from the plurality of teletypewriter-modes for use in the incoming call when no teletypewriter-mode is associated with the phone number; and
    selecting a default one of the plurality of teletypewriter-modes for use in the incoming call when no user selection is received within a predetermined time.

2. The method of claim 1 wherein, if the one of the plurality of teletypewriter-modes is associated with the phone number, the method further comprises:
    retrieving the one of the plurality of teletypewriter-modes associated with the phone number, the teletypewriter-mode having been previously associated with the phone number by an association application enabled to allow selection of the plurality of teletypewriter-modes at a user interface of the user equipment;
    using the retrieved teletypewriter-mode to configure the user equipment according to the retrieved teletypewriter-mode for use in the incoming call; and
    after detecting the call has terminated, restoring the configuration of the user equipment back to one of a non-teletypewriter mode and the default one of the plurality of teletypewriter-modes.

3. The method of claim 2 wherein the plurality of teletypewriter-modes enabled for selection comprises at least two modes, the two modes comprising: 2-way teletypewriter communication mode with no audio; and teletypewriter off with 2-way audio.

4. The method of claim 2 wherein an audio mode is associated with the retrieved teletypewriter-mode.

5. The method of claim 2 wherein an audio mode is hierarchically selected, the method further comprising:
    determining if any audio mode is associated with the phone number;
    if not, determining if any audio mode is associated with the retrieved teletypewriter-mode; and
    if not, selecting a default audio mode as the audio mode.

6. The method of claim 1 wherein, if the one of the plurality of teletypewriter-modes is associated with the phone number, the method further comprises:
    retrieving the one of the teletypewriter-modes associated with the phone number, the one of the plurality of teletypewriter-modes having been previously associated with the phone number by an association application enabled to allow selection of the plurality of teletypewriter-modes at a user interface of the user equipment;
    using the retrieved teletypewriter-mode to configure the user equipment according to the retrieved teletypewriter-mode for use in the incoming call; and
    after detecting the call has terminated, maintaining the configuration of the user equipment according to the retrieved teletypewriter-mode for use in a subsequent call.

7. The method of claim 6 wherein the subsequent call is an outgoing call.

8. The method of claim 1 wherein an audio mode is associated with the phone number.

9. The method of claim 1 wherein an audio mode is associated with all teletypewriter-modes available to the user equipment.

10. The method of claim 1 further comprising automatically enabling a headset, in communication with the user equipment, for at least one of audio input and output for use in the incoming call.

11. A user equipment configurable for setting teletypewriter-mode for use in an incoming call, the user equipment comprising:
a processor;
wherein said processor is configured to perform processor executable instructions comprising:
detecting the incoming call;
determining a phone number for the incoming call;
determining if one of a plurality of teletypewriter modes is associated with the phone number;
enabling selection from the plurality of teletypewriter-modes for use in the incoming call when no teletypewriter-mode is associated with the phone number; and
selecting a default one of the plurality of teletypewriter-modes for use in the incoming call when no user selection is received within a predetermined time.

12. The user equipment of claim 11 wherein, if the one of the plurality of teletypewriter-modes is associated with the phone number, the processor executable instructions further comprise:
retrieving the one of the plurality of teletypewriter-modes associated with the phone number, the one of the plurality of teletypewriter-modes having been previously associated with the phone number by an association application enabled to allow selection of the plurality of teletypewriter-modes at a user interface of the user equipment;
using the retrieved teletypewriter-mode to configure the user equipment according to the retrieved teletypewriter-mode for use in the incoming call; and
after detecting the call has terminated, restoring the configuration of the user equipment back to one of a non-teletypewriter mode and the default teletypewriter-mode.

13. The user equipment of claim 12 wherein the plurality of teletypewriter-modes enabled for selection comprises at least two modes, the two modes comprising: 2-way teletypewriter communication mode with no audio; and teletypewriter off with 2-way audio.

14. The user equipment of claim 12 wherein an audio mode is associated with the retrieved teletypewriter-mode.

15. The user equipment of claim 12 wherein an audio mode is hierarchically selected, and the processor executable instructions further comprise:
determining if any audio mode is associated with the phone number;
if not, determining if any audio mode is associated with the retrieved teletypewriter-mode; and
if not, selecting a default audio mode as the audio mode.

16. The user equipment of claim 11 wherein, if the one of the plurality of teletypewriter-modes is associated with the phone number, the processor executable instructions further comprise:
retrieving the one of the plurality of teletypewriter-modes associated with the phone number, the teletypewriter-mode having been previously associated with the phone number by an association application enabled to allow selection of the plurality of teletypewriter-modes at a user interface of the user equipment;
using the retrieved teletypewriter-mode to configure the user equipment according to the retrieved teletypewriter-mode for use in the incoming call; and
after detecting the call has terminated, maintaining the configuration of the user equipment according to the retrieved teletypewriter-mode for use in a subsequent call.

17. The user equipment of claim 16 wherein the subsequent call is an outgoing call.

18. The user equipment of claim 11 wherein an audio mode is associated with the phone number.

19. The user equipment of claim 11 wherein an audio mode is associated with all teletypewriter-modes available to the user equipment.

20. The user equipment of claim 11 wherein the processor executable instructions further comprise automatically enabling a headset, in communication with the user equipment, for at least one of audio input and output for use in the incoming call.

* * * * *